June 2, 1970     W. H. DAVENPORT     3,514,950
HYDRAULIC SYSTEM
Filed April 16, 1968
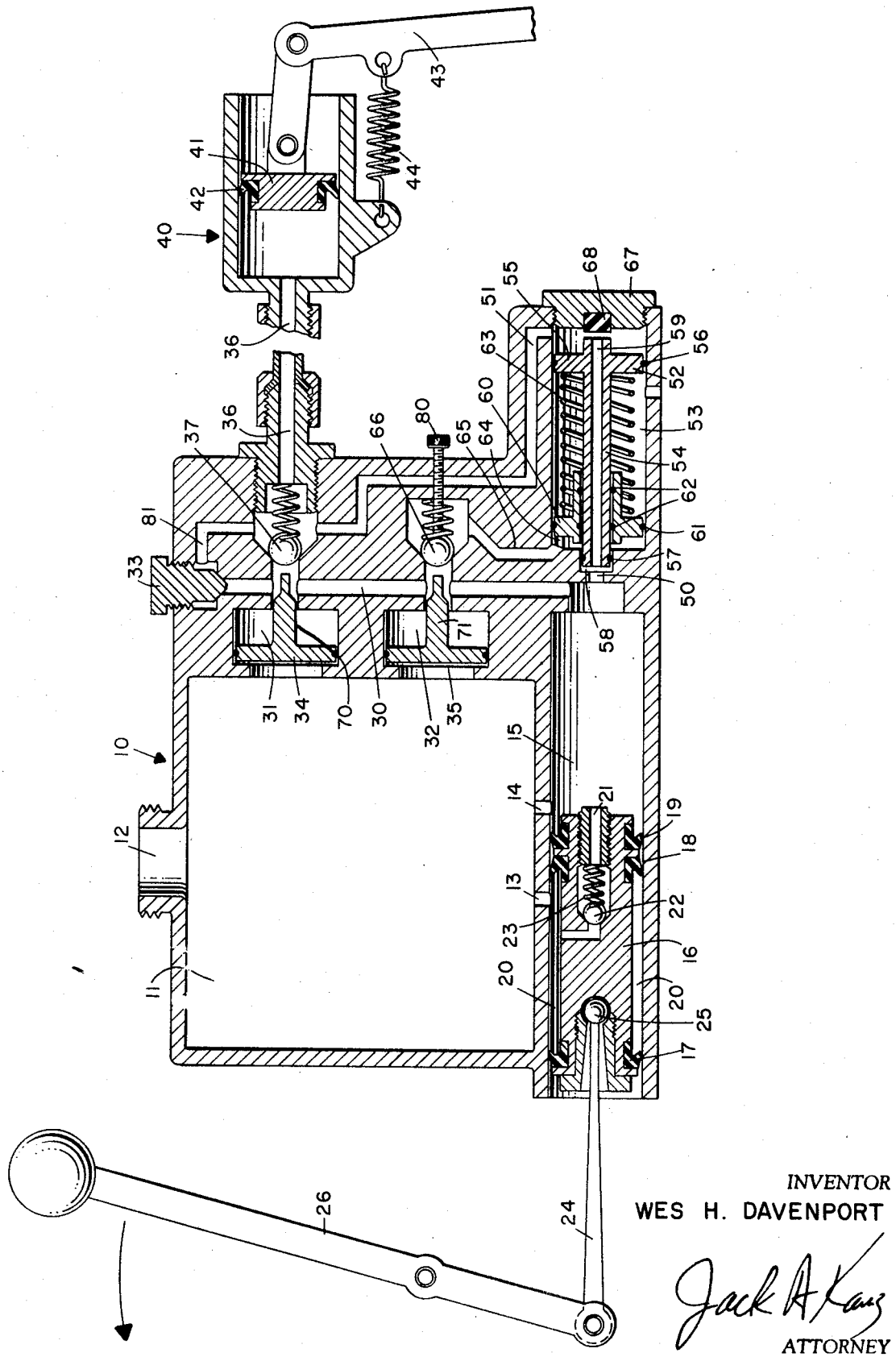
INVENTOR
WES H. DAVENPORT
*Jack A. Kanz*
ATTORNEY 3,514,950
HYDRAULIC SYSTEM
Wes H. Davenport, Irving, Tex., assignor of one-half to
   Thomas L. Miles, Jr., Irving, Tex.
Filed Apr. 16, 1968, Ser. No. 721,635
Int. Cl. F15b 7/00, 7/08
U.S. Cl. 60—54.5                                10 Claims

ABSTRACT OF THE DISCLOSURE

Disclosed is a system for controlling distribution of fluids within an apparatus including a master cylinder for controlling one or more remote slave cylinders. The system includes a check valve which allows fluid flow only in one direction and means for providing fluid flow in the opposite direction which is responsive to relative pressures at various points in the system. The disclosed system also includes a pressure sensitive control valve for maintaining pre-set pressures in the slave cylinder.

---

This invention relates to hydraulic systems. More particularly it relates to a master-slave hydraulic system for use as a remote positioning apparatus for providing control and positioning of mechanical systems such as throttles and the like.

Most apparatus currently used for remote control systems rely on direct mechanical control linkage consisting essentially of a series of rods or cables and pulleys. For instance, the usual control linkage for throttle control of inboard and outboard boat motors as well as aircraft engines and the like includes a control lever connected to a sheathed cable or a series of cables, drums and pulleys which in turn is connected to the throttle of the motor. Throttle position is controlled by mechanical adjustment of the position of the control lever. However, it is well known that such systems are neither accurate nor smoothly operable. Furthermore, such control cables tend to kink and freeze and are sometimes troublesome.

The disadvantages of control cables are exaggerated when used for the throttle control linkage of outboard motors since such linkage is usually exposed to the elements and frequently exposed to salt air and water. Aircraft throttle controls are also subject to severe flexing as the airframe flexes in adverse weather. Under such conditions control cables tend to bind and often vibrate and wear. It is therefore an object of this invention to provide a remote control system which relies on hydraulic pressures to position and control remote mechanical parts such as throttles and the like. A further object is to provide a remote control linkage system which is virtually immune to weather, wear, binding, vibration, and other disadvantages commonly found in mechanical linkages, and to provide a remote control system which operates uniformly, smoothly and precisely over the entire operating range.

Still another object of this invention is to provide a simple, inexpensive control system which automatically compensates for fluid expansion due to temperature changes, and a system for providing a pre-set throttle position and cruise control whereby the position of the throttle may be advanced as desired but will automatically return to the pre-set condition.

A particular advantage of the control system of this invention is the elimination of cable linkages and the like which are subject to weather and binding. A further advantage of the invention is an automatic cruise control mechanism which allows the operator to pre-set a particular throttle setting which may be overcome by the operator at will, but which will remain as a pre-set condition to which the throttle will return automatically.

The control system of this invention is also adaptable to several automatic protection systems, and is easily adapted to fully automated control systems. Other objects, features and advantages will become more readily understood from the following detailed description taken in connection with the appended claims and attached drawing in which the sole figure is an elevational view, partially in section, of a master and slave cylinder hydraulic system embodying the principles of the invention.

Briefly, the present invention provides a hydraulic control system comprising a master cylinder in fluid communication with a remote slave cylinder through a fluid transmitting and controlling apparatus. The apparatus contains a pair of check valves and a pressure sensitive regulating means for maintaining a predetermined set pressure in the slave cylinder. Thus, in operation, the slave cylinder may be advanced to any desired position and will remain in such position until further adjustment is made by way of the master cylinder. The pressure sensitive regulation system provides a by-pass relief to maintain the precise set pressure in the slave cylinder, thus compensating for expansion of hydraulic fluid in the slave cylinder. At all times, however, the movement of the control lever is synchronous with the controlled lever.

Referring now to the figure, there is illustrated the preferred embodiment of the invention which includes a master cylinder unit generally indicated at 10 having a hydraulic fluid reservoir 11. A filling port 12 is located at the top of the reservoir and a pair of ports 13 and 14 at the bottom of the reservoir communicate with the master cylinder 15. Slideably fitted within the cylinder 15 is a piston 16. Piston 16 carries sealing rings 17, 18, and 19 which provide a fluid-tight seal between the piston and the cylinder wall. Sealing rings 17 and 18 are positioned near opposite ends of the piston 16 to form an annular chamber 20 which is in fluid communication with port 13. Piston 16 is also provided with a centrally located bore 21 within which is located a check valve such as ball 22 and spring 23. Ball 22 seats in the shoulder of bore 21 to prevent fluid from flowing from the cylinder 15 back through passage 21 but to allow fluid from the reservoir 11 to be drawn through port 13, annular cavity 20, and into cylinder 15 through passageway 21 when the difference in pressure in cylinder 15 and the pressure in the reservoir 11 is sufficient to overcome spring 23. Spring 23 should be strong enough to prevent the valve from opening until a difference in pressure of near one atmosphere is obtained.

Piston 16 is mechanically attached to connecting rod 24 through ball and socket connection 25. Rod 24 is attached to control lever 26 which may be used to either advance or retard the position of the piston 16.

When the piston 16 is in the fully retarded position (as shown in the figure) the cylinder 15 is in fluid communication with the reservoir 11 through port 14. Fluid may then pass from the reservoir into cylinder 15 to maintain the entire system full of fluid. As the lever 26 is advanced to the left, piston 16 is moved to the right until seals 18 and 19 pass port 14, thus sealing cylinder 15 from reservoir 11.

Cylinder 15 is in fluid communication with distribution line 30. Fluid distribution line 30 is in fluid communication with chambers 31 and 32, and the upper end thereof is closed by plug 33. Positioned within each of chambers 31 and 32 are free pistons 34 and 35, respectively.

Passage of fluid between distribution line 30 and work line 36 is controlled by check valve 37. Work line 36 is in fluid communication with slave cylinder generally indicated at 40.

Slave cylinder 40 is a single action cylinder having a piston 41 which fits inside the cylinder and which carries a sealing ring 42 which provides a fluid-tight seal between piston 41 and the interior walls of cylinder 40. Piston 41 is attached to the mechanical apparatus to be controlled, such as the throttle lever 43. Since cylinder 40 is a single action slave cylinder, spring 44 is provided to maintain a constant back pressure on the fluid inside cylinder 40 and to return the lever 43 to the retarded position as fluid is allowed to escape from the slave cylinder 40.

Fluid in work line 36 is also in direct communication with the pressure regulation system by means of by-pass line 51. The pressure regulation system comprises a two-piece spool valve 52 positioned within a cylinder 53. Valve 52 comprises a tubular shank 54 and an enlarged flange portion 55 which carries an O-ring 56 to provide fluid-tight seal between the valve 52 and the walls of cylinder 53. The opposite end of valve 52 has an annular O-ring seal 57 which fits within housing 58. Valve 52 has a centrally located bore 59 passing through the entire length thereof. It should be noted that in the position shown in the figure, a fluid passageway is provided between the master cylinder 15 and work line 36 through the central bore 59 in valve 52 and by-pass line 51.

An annular flange 60 is slideably mounted on the shank portion of spool valve 52. Flange 60 carries a sealing O-ring 61 to sealably contact the flange with the interior walls of the cylinder and a pair of sealing O-rings 62 for providing a fluid seal between the flange and the shank of valve 52. Thus it will be seen that the two-piece valve 52 effectively divides cylinder 53 into three chambers. A spring 63, positioned on the shank of valve 52, rides on the shoulder of flange 60 to urge the flange 60 and the flanged portion 55 in opposite directions. It should be noted that flange 60 separates the cylinder 53 to form an enclosed annular chamber 64 which is in fluid communication with passageway 65. Passageway 65 is separated from distribution line 30 by check valve 66. Flanged portion 55 further separates the cylinder 53 to form an enclosed chamber which is in fluid communication with by-pass line 51.

The end of the pressure regulator cylinder 53 is enclosed by plug 67 which carries a sealing seat 68. It will be noted that when spool valve 52 is held against sealing seat 68, the central bore through the valve is closed, thus interrupting fluid flow between the master cylinder 15 and by-pass line 51.

To operate the system described, the control lever 26 is advanced (to the left as shown by the arrow in the drawing) which urges piston 16 toward the right as shown in the drawing. When seal 19 passes port 14, master cylinder chamber 15 is sealed from the reservoir 11 and pressure exerted on the fluid in the system. When the pressure in cylinder 15 and distribution line 30 is sufficient to overcome check valve 37, fluid flows from the distribution line 30 into work line 36. Fluid from work line 36 flows directly into slave cylinder 40. When the pressure in cylinder 40 is sufficient to overcome spring 44 the piston 41 is slave cylinder 40 is moved to the right, thus advancing lever 43.

It will be noted that the fluid pressure in work line 36 will at all times be equal to the pressure in by-pass line 51.

Compression of the fluid in distribution line 30 also overcomes check valve 66, thus causing fluid to flow through line 65 into chamber 64. It will be noted that when check valves 37 and 66 are open, the fluid pressure throughout the entire system is equal. However, when valves 37 and 66 are closed, the fluid is entrapped in cylinder 40 and by-pass line 51 as well as in chamber 64 and line 65. The pressure in line 65 and chamber 64 causes flange 60 to exert pressure on spring 63, which in turn urges flange 55 and shank 54 toward plug 67. The position of plug 67 is adjustable and should be positioned so that the open end of bore 59 is firmly resting on sealing seat 68 when the pressure in lines 51 and 65 are equal. Note that when the pressure in distribution line 30 is equal to the pressure in work line 36 and by-pass line 65, check valves 37 and 66 will automatically close. Thus the position of slave cylinder piston 41 will be locked without applying sustaining pressure on lever 26.

To retard lever 43, lever 26 is moved in the opposite direction (to the right as shown in the drawing) thus producing a reduced pressure in cylinder 15. As the pressure in cylinder 15 is reduced below the pressure in reservoir 11 (which is normally atmospheric pressure), pistons 34 and 35 are drawn to the right (as shown in the drawing) thus forcing pins 70 and 71 against check valves 37 and 66, respectively. As the lever 26 is retarded the pressure differential is great enough for pins 70 and 71 to dislodge check valves 37 and 66 from the seatings in the housing, thus allowing fluid to flow from slave cylinder 40 into master cylinder 15. Lever 43 is then retarded by the joint action of spring 44 and the reduction of pressure inside slave cylinder 40 drawing piston 41 to the left as shown in the drawing. Thus it will be seen that the position of throttle 43 responds in relation to the position of lever 26 and that throttle 43 is locked in any position to which it is advanced by movement of lever 26 when pressure is no longer applied to lever 26.

It will be noted that the basic function of the system described above did not require the use of the pressure regulation system described with reference to valve 52. However, the pressure regulator performs a unique function. As described above, whenever the lever 26 is advanced to the left in the drawing, piston 41 in the slave cylinder 40 is moved to the right to advance throttle lever 43. Due to the action of check valve 37, fluid becomes entrapped in line 36 and cylinder 40, thus it would be impossible to retard the throttle 43 without first dislodging check valve 37. The pressure regulation apparatus hereinabove described provides a safety mechanism whereby pressure may be relieved in slave cylinder 40 other than by manipulation of lever 26. For example, when the system described is used as the throttle control mechanism, a manual override may be desired to allow dual control of throttle 43. By manually moving throttle 43, the pressure in slave cylinder 40 and lines 36 and 51 may be increased. When the pressure in line 51 is increased sufficiently to compress spring 63, spool valve 52 is lifted from the sealing seat 68. Fluid may then pass directly back into the master pressure cylinder 15. Thus, for normal operation, plug 67 should be adjusted so that valve 52 is normally snugly resting on sealing seat 68, and spring 63 may be overcome by only slightly more pressure than that exerted by spring 44.

The pressure regulation system described thus provides compensation for thermal expansion of fluids in cylinder 40 during continuous operation. For example, should the fluid in cylinder 40 expand, the position of piston 41 would be moved unless adequate means are provided to relieve the increased pressure. However, as the pressure increases in cylinder 40 the pressure is likewise increased in by-pass line 51 and, when the increase in pressure is sufficient to overcome the spring 63, valve 52 is unseated from sealing seat 68 thus allowing a pressure relief of the fluid until the desired pressure is again achieved. However, since the fluid trapped in chamber 64 is equal to the original pressure in cylinder 40, as soon as the pressure in cylinder 40 is lowered to the original pressure, the fluid in chamber 64, by exertion of pressure on flange 55 through spring 63, forces the valve 52 closed. Thus the original pressure is maintained in cylinder 40.

Manual override of the hydraulic system disclosed is accomplished by manually retarding throttle 43 with sufficient force to overcome spring 63. However, in this case, fluid remains trapped in chamber 64 which is at a higher pressure than that in cylinder 40. Therefore, valve 52 will remain closed until the pressure in by-pass line 51 is again increased to a pressure greater than the pressure in chamber 64.

It will be noted that the unique design of this invention permits incorporation of a pre-set position which will automatically be re-established regardless of the position of lever 26 as long as lever 26 is advanced to a point higher than the pre-set position. To establish the pre-set condition, lever 26 is advanced to the desired throttle setting. When the desired setting is achieved, locking pin 80 is forced against the check valve 66, thereby preventing check valve 66 from being opened by pin 71. In this condition a pre-set pressure is maintained in annular chamber 64 which in turn governs the pressure exerted on spool valve 52. Thus with valve 66 locked, one may increase the pressure in slave cylinder 40 by further advancing lever 26 and thus go past the pre-set throttle condition. However, when the operator releases lever 26, the pressure in cylinder 40 is greater than that required to overcome spring 63, thus the excess pressure is relieved through valve 52 until the equilibrium point maintained by the pre-set pressure in annular chamber 64 is achieved. At this condition valve 52 again rests firmly on seating seat 68 and throttle 43 has returned to the pre-set condition. Note, however, that the movement of lever 26 will at all times be synchronous with the movement of lever 43.

It will also be noted that if the operator retards the throttle below the pre-set point by moving lever 26 to the right (as shown in the drawing), piston 34 moves to the right allowing pin 70 to dislodge check valve 37 from its seat, thereby relieving pressure in the work line 36. However, since check valve 66 is locked, the pressure is still maintained in annular chamber 64 and valve 52 will remain firmly seated against seating seal 68. Thus when the throttle is again advanced, by moving control lever 26 to the left, throttle 43 is advanced normally until pressure on lever 26 is relieved. If the pressure in cylinder 40 is greater than the pressure at annular chamber 64, the excess pressure will be relieved as described hereinabove so that the throttle again returns to the pre-set condition.

Although locking pin 80 is shown and described herein as a manually operated device, it will be readily apparent that the pin may be electrically operated by such electromechanical means as solenoids and the like. Furthermore, locking pin 80 has no effect on the operation of lever 26 below the present point, thus the throttle 43 may be fully retarded while maintaining the maximum pre-set pressure in chamber 64.

For convenience and clarity of illustration, check valves 37 and 66 have been illustrated as ball and spring valves. It will readily be understood by those skilled in the art that other conventional check valves such as single and plural reed valves or any other mechanism for controlling uni-directional fluid flow may be substituted therefor. Likewise, the location of free pistons 34 and 35 so as to have one surface in contact with reservoir 11 is not essential. The surfaces may be exposed to the atmosphere if desired.

It will be understood by those skilled in the art that although sliding free pistons 34 and 35 are shown and described herein to dislodge and overcome the check valves 37 and 36, respectively, other suitable means may be used. For example, flexible diaphragms may be substituted for the sliding pistons and accomplish essentially the same results.

In the preferred embodiment of the invention, valve 66 should open at the same time or immediately before valve 37 opens in order to insure that the pressure in chamber 64 will be automatically adjusted with each movement of lever 26. This may be accomplished by designing the check valve 66 to be slightly smaller than check valve 37, or piston 35 slightly larger than piston 34. Like changes may be incorporated in other check valve systems to accomplish the same results.

As shown in the drawing, a direct by-pass line 81 may be provided to allow fluid from distribution line 30 to by-pass both check valves 37 and 66 and flow freely in both directions between work line 36 and distribution line 30. As illustrated in the drawing, the by-pass line 81 is blocked by plug 33. If plug 33 is removed a sufficient distance to allow direct passage from distribution line 30 to work line 36, spring 44 will force piston 41 to the left thus fully retarding the throttle. Plug 33 may, if desired, be utilized as a protection or control device by mechanically or otherwise moving plug 33 in response to motor conditions. For instance, plug 33 may be attached to a solenoid which maintains plug 33 closed when the system is functioning normally. If the solenoid controlling plug 33 is responsive to such conditions as engine temperature, oil pressure, vibration or other sensible conditions, plug 33 may be automatically withdrawn and thus throttle 43 automatically retarded when the solenoid is activated in response to detected undesirable conditions.

From the foregoing it will be apparent to those skilled in the art that the hydraulic system described herein may be used for various applications wherein it is desired to provide precise positioning of remote objects or mechanisms. Although the invention has been described with respect to control of a single remote slave cylinder, it will be apparent that multiple cylinders may be controlled in the same or similar manner and while the device has been described as a hand-operated master control cylinder, the master cylinder itself may be operated by automatic means such as auto-pilots and the like.

While the invention has been described with particular reference to a throttle control mechanism, it will be apparent to those skilled in the art that the same principles may be used in similar applications and that the precise configuration disclosed and described and components thereof may be varied as desired by those skilled in the art to produce the desired results. It is to be understood that although the invention is described with particular reference to specific embodiments thereof, the form of the invention shown and described in detail is to be taken as preferred embodiment of the same and that various changes and modifications may be resorted to without departing from the spirit and scope of the invention.

What is claimed is:

1. In a hydraulic system including a master cylinder and a slave cylinder, distribution means in fluid communication with said master cylinder and said slave cylinder comprising:
   (a) a fluid transmission line in fluid communication with said master cylinder and said slave cylinder,
   (b) a check valve disposed within said fluid transmission line and oriented to allow fluid passage from said master cylinder to said slave cylinder and prevent fluid flow from said slave cylinder to said master cylinder, and
   (c) means responsive to the pressure decrease in said master cylinder for opening said check valve.

2. The system set forth in claim 1 wherein said means for opening said check valve comprises a flexible diaphragm responsive to the pressure in said master cylinder, said diaphragm having a shank extending therefrom for opening said check valve.

3. The system set forth in claim 1 wherein said means for opening said check valve comprises a slideable piston having a shank portion and a head portion, the head portion of said piston forming part of the wall of said distribution means and slideably mounted to allow motion of said piston relative to said check valve, said shank portion extending from said head portion and into the orifice blocked by said check valve.

4. Apparatus for controlling pressures within a fluid distribution system between a master cylinder and at least one slave cylinder comprising:
   (a) conduit means having an entry port in fluid communication with said master cylinder and an exit port in fluid communication with said slave cylinder, (b) an enclosed chamber, said chamber having a first inlet in fluid communication with said entry port, (c) a valve dividing said chamber into three sections and having a shank portion longitudinally disposed within said chamber and an enlarged annular flanged portion near one end of said shank portion, said flanged portion sealably contacting the walls of said chamber in sliding relation therewith forming a first enclosed section of said chamber, the opposite end of said valve slideably and sealably journaled within said first inlet, said shank portion having a fluid channel passing longitudinally therethrough, said valve further having an annular flange slideably mounted on said shank, said annular flange sealably contacting the walls of said chamber forming a second enclosed section of said chamber, and a spring disposed about said shank portion between said enlarged annular flanged portion and said annular flange slideably mounted on said shank for urging said annular flanged portion and the slideable flange in opposite directions, (d) a first by-pass line in fluid communication with said exit port and said first enclosed section of said chamber, (e) a second by-pass line in fluid communication with said entry port and said second enclosed section of said chamber, (f) means for regulating fluid flow between said second enclosed section of said chamber and said entry port, and (g) means for conducting fluid from said entry port to said exit port.

5. The apparatus defined in claim 4 and further including a check valve disposed within said means for conducting fluid from said entry port to said exit port.

6. The apparatus defined in claim 5 and further including means responsive to the fluid pressure in said master cylinder for controllably opening said check valve.

7. The apparatus defined in claim 6 wherein said means for regulating fluid flow between said second enclosed section of said chamber and said entry port comprises:

(a) a second check valve for allowing fluid from said entry port to said enclosed section but prevents fluid flow from said enclosed section to said entry port, and (b) means responsive to the fluid pressure in said master cylinder for controllably opening said second check valve.

8. The apparatus defined in claim 7 and further including means for locking said second check valve in closed position.

9. Apparatus for controlling fluid flow through a conduit interconnecting first and second hydraulic cylinders comprising:

(a) valve means which opens to allow fluid to flow from said first cylinder to said second cylinder when the fluid pressure in said first cylinder is greater than the fluid pressure in said second cylinder and closes to prevent fluid flow from said second cylinder to said first cylinder when fluid pressure in said second cylinder is greater than fluid pressure in said first cylinder and fluid pressure in said first cylinder is greater than atmospheric pressure, and (b) valve relief means for opening said valve means to allow fluid to flow from said second cylinder to said first cylinder when fluid pressure in said second cylinder is greater than fluid pressure in said first cylinder and the fluid pressure in said first cylinder is less than atmospheric pressure.

10. The apparatus defined in claim 9 and further including:

(a) a fluid pressure regulating chamber, said fluid pressure regulating chamber having first and second inlets in fluid communication with the output of said master cylinder and a third inlet in fluid communication with said input of said slave cylinder, (b) a check valve for controlling fluid flow between said output of said master cylinder and said second inlet, and (c) valve means disposed within said fluid pressure regulating chamber, said valve means having a tubular shank with a bore extending therethrough, the bore in said shank in fluid communication with said first inlet and said third inlet, a flange slideably mounted on said shank forming an enclosed portion of said chamber in fluid communication with said second inlet, an annular flanged portion affixed to said shank portion and forming an enclosed portion of said chamber in fluid communication with said third inlet, and biasing means for urging said annular flanged portion and said flange in opposite directions.

References Cited

UNITED STATES PATENTS

| | | | |
|---|---|---|---|
| 1,163,541 | 12/1915 | Hultin | 60—54.5 XR |
| 2,281,538 | 4/1942 | Leichsenring | 60—54.5 XR |
| 2,389,962 | 11/1945 | Dougherty | 60—54.5 |
| 2,582,896 | 1/1952 | Acton | 60—54.5 XR |
| 2,722,947 | 11/1955 | Sragal | 60—54.5 XR |
| 2,805,737 | 9/1957 | Griffin | 60—54.5 XR |
| 2,847,827 | 8/1958 | Johnson | 60—54.5 XR |
| 2,967,396 | 1/1961 | Staadt | 60—54.5 |

MARTIN P. SCHWADRON, Primary Examiner

R. BUNEVICH, Assistant Examiner

U.S. Cl. X.R.

60—54.6